(12) United States Patent
Endo (10) Patent No.: US 7,426,083 B2
(45) Date of Patent: Sep. 16, 2008

(54) IMAGING OPTICAL SYSTEM AND IMAGE CAPTURING APPARATUS INCLUDING IMAGING OPTICAL SYSTEM

(75) Inventor: Hiroshi Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 11/429,525

(22) Filed: May 4, 2006

(65) Prior Publication Data
US 2006/0256453 A1    Nov. 16, 2006

(30) Foreign Application Priority Data
May 11, 2005    (JP)    ............... 2005-138525

(51) Int. Cl.
   *G02B 13/02* (2006.01)
(52) U.S. Cl. ..................... 359/745; 359/772
(58) Field of Classification Search ......... 359/745–748, 359/756–757, 771–772
   See application file for complete search history.

(56) References Cited

U.S. PATENT DOCUMENTS

| | | |
|---|---|---|
| 4,348,084 A | 9/1982 | Kitagishi et al. |
| 5,629,799 A | 5/1997 | Maruyama et al. |
| 5,790,321 A | 8/1998 | Goto |
| 5,796,520 A | 8/1998 | Maruyama |
| 5,838,497 A | 11/1998 | Maruyama |
| 5,883,744 A | 3/1999 | Maruyama |
| 5,914,822 A | 6/1999 | Maruyama et al. |
| 5,969,862 A | 10/1999 | Maruyama |
| 6,118,597 A | 9/2000 | Maruyama |
| 6,268,969 B1 * | 7/2001 | Ogawa .......... 359/745 |
| 6,313,958 B1 * | 11/2001 | Ogawa .......... 359/745 |
| 6,381,079 B1 | 4/2002 | Ogawa |
| 7,136,226 B2 * | 11/2006 | Suzuki ......... 359/569 |

FOREIGN PATENT DOCUMENTS

| | | |
|---|---|---|
| JP | 59-65820 A | 4/1984 |
| JP | 6-324262 A | 11/1994 |
| JP | 6-331887 A | 12/1994 |
| JP | 2000-258685 A | 9/2000 |
| JP | 2002-72082 A | 3/2002 |

* cited by examiner

*Primary Examiner*—Jordan M Schwartz
(74) *Attorney, Agent, or Firm*—Canon USA Inc IP Division (57) ABSTRACT

At least one exemplary embodiment is directed to an imaging optical system which includes a first lens unit having a positive refractive power and a second lens unit having a negative refractive power. The first lens unit includes a first lens sub-unit including a single lens having a positive refractive power, a second lens sub-unit including a diffractive optical part and having a positive refractive power, and a third lens sub-unit having a negative refractive power. The first to third lens sub-units are disposed in this order from the object side to the image side. The diffractive optical part can be convex towards the object side and the following condition can be satisfied: $0.05 < L1/OTL < 0.2$ where $L1$ denotes a distance between the first lens sub-unit and the second lens sub-unit and OTL denotes the total optical length.

11 Claims, 8 Drawing Sheets

IMAGING OPTICAL SYSTEM AND IMAGE CAPTURING APPARATUS INCLUDING IMAGING OPTICAL SYSTEM

BACKGROUND OF THE INVENTION

1. Field of the Invention

The present invention relates to an imaging optical system.

2. Description of the Related Art

Long-focus imaging optical systems that include a telephoto lens system including a front lens unit having positive refractive power and a rear lens unit having negative refractive power in a direction from an object to an image plane have been widely used.

In general for long-focus telephoto lenses, as the focal length increases, chromatic aberrations (e.g., axial chromatic aberration and chromatic aberration of magnification) particularly increase among the various other aberrations.

To correct and/or reduce these chromatic aberrations (to achromatize the lens), a variety of types of telephoto lens have been discussed in which a positive lens formed from a material having a low dispersion ratio and also having an extraordinary partial dispersion characteristic (e.g., fluorite or FK01™ manufactured by Schott Inc.) is combined with a negative lens formed from a material having a high dispersion ratio.

Although glass having an extraordinary partial dispersion characteristic, such as fluorite or FK01, corrects and/or reduces chromatic aberration, the glass can be very difficult to fabricate. Also, the specific gravity of the glass is higher than that of other types of glass having a low partial dispersion ratio and not having an extraordinary partial dispersion characteristic, and therefore, the entire lens system becomes heavy. For example, the specific gravity of fluorite is 3.18 and the specific gravity of FK01 is 3.63. In contrast, the specific gravity of FK5™ and BK7™ manufactured by Schott Inc. and having a low extraordinary partial dispersion characteristic are 2.46 and 2.52, respectively. Furthermore, the surface of glass having an extraordinary partial dispersion characteristic is equivalently easily damaged. Still furthermore, an FK01 lens of large diameter can be cracked when the temperature of the surroundings is rapidly changed.

In addition to the above-described method for combining lens materials (lenses) having different dispersion ratios in order to correct and/or reduce the chromatic aberrations of an optical system, another method has been discussed in which a diffractive optical element including a diffractive optical part disposed on a substrate is employed in the optical system in order to reduce the chromatic aberrations (refer to, for example, U.S. Pat. No. 5,790,321, U.S. Pat. No. 5,629,799, U.S. Pat. No. 5,796,520, U.S. Pat. No. 5,838,497, U.S. Pat. No. 5,883,744, U.S. Pat. No. 5,914,822, U.S. Pat. No. 5,969,862, U.S. Pat. No. 6,118,597, Japanese Patent Laid-Open No. 2002-072082, and U.S. Pat. No. 4,348,084).

U.S. Pat. No. 5,790,321 describes a telephoto lens that can sufficiently correct and/or reduce chromatic aberrations. The telephoto lens has an F number of about F2.8 and includes at least one diffractive optical element having positive refractive power and at least one refractive optical element having negative refractive power.

U.S. Pat. No. 5,629,799, U.S. Pat. No. 5,796,520, U.S. Pat. No. 5,838,497, U.S. Pat. No. 5,883,744, U.S. Pat. No. 5,914,822, U.S. Pat. No. 5,969,862, and U.S. Pat. No. 6,118,597 describe a telephoto lens that can sufficiently correct and/or reduce the chromatic aberrations by combining a diffractive optical element with a refractive optical element. The telephoto lens has an F number of about F2.8.

Japanese Patent Laid-Open No. 2002-072082 describes a high-performance, lightweight, and compact telephoto lens including a first lens unit having positive refractive power, a second lens unit having negative refractive power, and a third lens unit having positive refractive power disposed from an object side to an image side, and further including a diffractive optical element in the first lens unit at a position closest to the object.

In addition, in most photographic lenses (i.e., optical systems), focusing is carried out by moving the entire photographic lens or by moving one of the lens units in the photographic lens. In the case of long-focus telephoto lenses, since the telephoto lenses are large-sized and very heavy, it can be difficult to mechanically move the entire telephoto lenses to carry out focusing.

Accordingly, many conventional telephoto lenses carry out focusing by moving one of the lens units. Recently, many inner focusing telephoto lens have been discussed in which focusing is carried out by moving one of the lens units in the middle section, which is equivalently compact and lightweight compared with a front lens unit (refer to, for example, U.S. Pat. No. 4,348,084 and Japanese Patent Laid-Open No. 59-065820).

U.S. Pat. No. 4,348,084 describes an inner focusing telephoto lens, which can have a focal length of 300 mm and an F number of 2.8, while Japanese Patent Laid-Open No. 59-065820 describes an inner focusing telephoto lens, which can have a focal length of 135 mm and an F number of about 2.8.

Either one of these discussed inner focusing telephoto lens includes a first lens unit having positive refractive power, a second lens unit having negative refractive power, and a third lens unit having positive refractive power in this order from an object side. Focusing is accomplished by moving the second lens unit along the optical axis.

Furthermore, an inner focusing telephoto lens including a diffractive optical element have been discussed (refer to, for example, U.S. Pat. No. 6,381,079). U.S. Pat. No. 6,381,079 describes a telephoto lens in which a first lens unit having positive refractive power, a second lens unit having negative refractive power, and a third lens unit are disposed in this order from an object side to an image side, the first lens unit including a diffractive optical element, the second lens unit including only one lens, and focusing being carried out by the second lens unit.

Additionally, a diffractive optical element having a portion formed from a low UV resistance material and having a device configured to block a UV ray on the light incident side is discussed in, for example, U.S. Pat. No. 6,522,464.

In general, in order to provide a desired optical performance, a telephoto lens that is a refractive optical system requires a certain lens length in accordance with the F number and focal length of the telephoto lens. Therefore, the weight of the telephoto lens tends to increase.

In contrast, an optical system including a diffractive optical element can easily provide a high optical performance while reducing the lens length and sufficiently correcting and/or reducing chromatic aberrations.

However, simply providing the diffractive optical element to the optical system does not sufficiently achieve a high optical performance while reducing the lens length and sufficiently correcting and/or reducing chromatic aberrations. The position of the diffractive optical element in the optical system and the level of the power of the diffractive optical element are critical.

SUMMARY OF THE INVENTION

At least one exemplary embodiment is directed to an imaging optical system suitably adapted for use in an image capturing apparatus (e.g., a photographic camera, a video camera, a digital still camera, or other related or equivalent image capturing apparatus and/or methods as known by one of ordinary skill in the relevant art).

At least one exemplary embodiment is directed to a telephoto imaging optical system which can have a short lens length and capable of sufficiently correcting and/or reducing chromatic aberrations. At least one exemplary embodiment also provides an image capturing apparatus including the telephoto imaging optical system.

According to an exemplary embodiment of the present invention, an imaging optical system includes a first lens unit having positive refractive power and a second lens unit having negative refractive power. The first lens unit and the second lens unit are disposed in this order from an object side to an image side. The first lens unit includes a first lens including a single lens having a positive refractive power, a second lens sub-unit including a diffractive optical part and having a positive refractive power, and a third lens sub-unit having negative refractive power. The first to third sub-units are disposed in this order from the object side to the image side. The diffractive optical part is convex towards the object and the following condition can be satisfied:

$$0.05 < L1/OTL < 0.2$$

where L1 denotes a distance between the first lens sub-unit and the second lens sub-unit and OTL denotes the total optical length.

According to another exemplary embodiment of the present invention, an image capturing apparatus includes an imaging optical system and a solid-state image sensing element configured to receive an image formed by the imaging optical system. The imaging optical system includes a first lens unit having a positive refractive power and a second lens unit having a negative refractive power. The first lens unit and the second lens unit are disposed in this order from an object side to an image side. The first lens unit includes a first lens sub-unit including a single lens having a positive refractive power, a second lens sub-unit including a diffractive optical part and having a positive refractive power, and a third lens sub-unit having a negative refractive power. The first to third sub-units are disposed in this order from the object side to the image side. The diffractive optical part is convex towards the object and the following condition can be satisfied:

$$0.05 < L1/OTL < 0.2$$

where L1 denotes a distance between the first lens sub-unit and the second lens sub-unit and OTL denotes the total optical length.

According to another exemplary embodiment of the present invention, an imaging optical system includes a first lens unit having a positive refractive power, a second lens unit having a negative refractive power, the second lens unit being movable along the optical axis so as to achieve focusing, and a rear lens unit including at least one sub lens unit. The first lens unit, the second lens unit, and the rear lens unit are disposed in this order from an object side to an image side. The first lens unit includes a first lens sub-unit including a single lens having a positive refractive power, a second lens sub-unit including a diffractive optical part and having a positive refractive power, and a third lens sub-unit having a negative refractive power. The first to third sub-units are disposed in this order from the object side to the image side, and an air gap between the first lens sub-unit and the second lens sub-unit is the largest while an air gap between the second lens sub-unit and the third lens sub-unit is the second largest. The diffractive optical part is convex towards the object and the following condition can be satisfied:

$$0.05 < L1/OTL < 0.2$$

where L1 denotes a distance between the first lens sub-unit and the second lens sub-unit and OTL denotes the total optical length.

According to still another exemplary embodiment of the present invention, an image capturing apparatus includes an imaging optical system and a solid-state image sensing element configured to receive an image formed by the imaging optical system. The imaging optical system includes a first lens unit having a positive refractive power, a second lens unit having a negative refractive power, where the second lens unit is movable along the optical axis so as to achieve focusing, and a rear lens unit includes at least one sub lens unit. The first lens unit, the second lens unit, and the rear lens unit are disposed in this order from an object side to an image side. The first lens unit includes a first lens sub-unit including a single lens having a positive refractive power, a second lens sub-unit including a diffractive optical part and having a positive refractive power, and a third lens sub-unit having a negative refractive power. The first to third lens sub-units are disposed in this order from the object side to the image side, and an air gap between the first lens sub-unit and the second lens sub-unit is the largest while an air gap between the second lens sub-unit and the third lens sub-unit is the second largest. The diffractive optical part is convex towards the object and the following condition can be satisfied:

$$0.05 < L1/OTL < 0.2$$

where L1 denotes a distance between the first lens sub-unit and the second lens sub-unit and OTL denotes the total optical length.

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of the present invention are described with reference to the-accompanying drawings.

First Exemplary Embodiment

Figure 1:
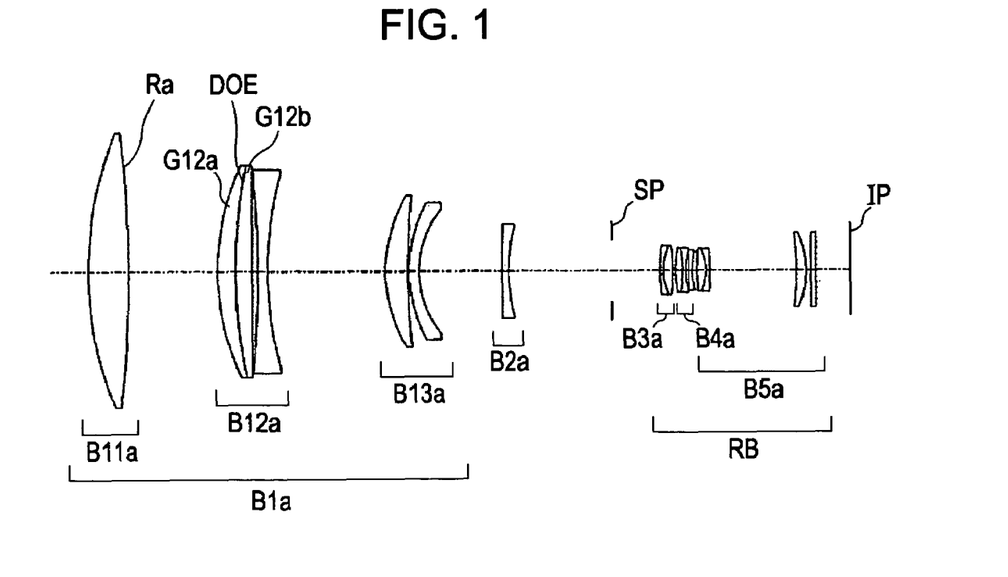
FIG. 1 is a sectional view of a lens system according to a first exemplary embodiment of the present invention.
Figure 2:
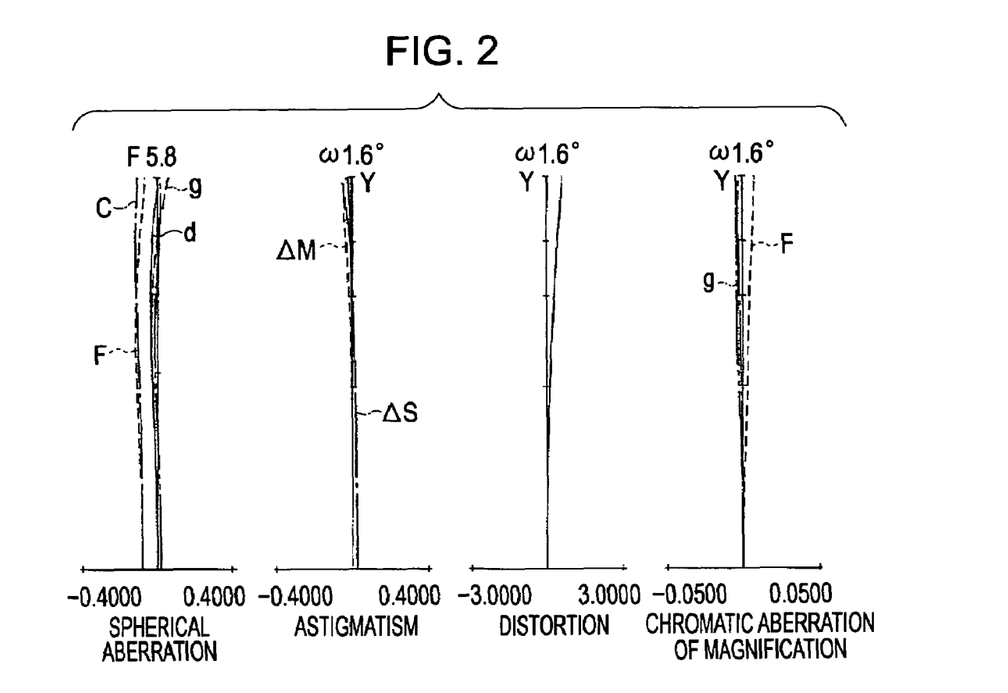
FIG. 2 is an aberration graph of an object at infinity according to the first exemplary embodiment of the present invention.
Figure 3:
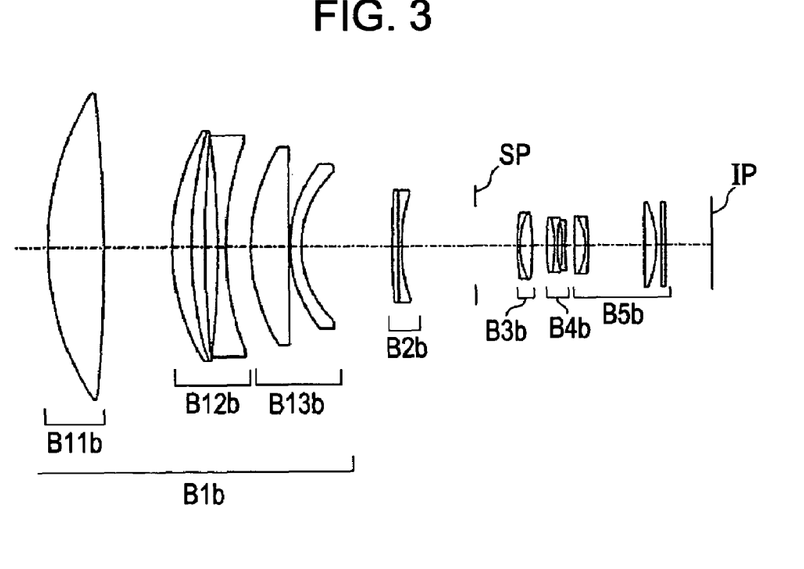
FIG. 3 is a sectional view of a lens system according to a second exemplary embodiment of the present invention.
Figure 4:
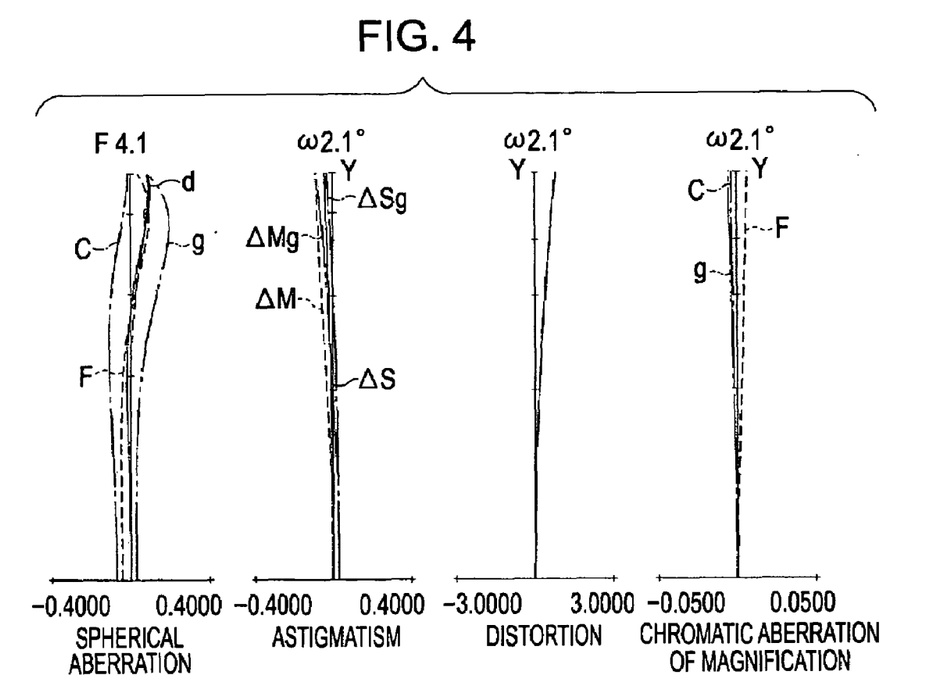
FIG. 4 is an aberration graph of an object at infinity according to the second exemplary embodiment of the present invention.
Figure 5:
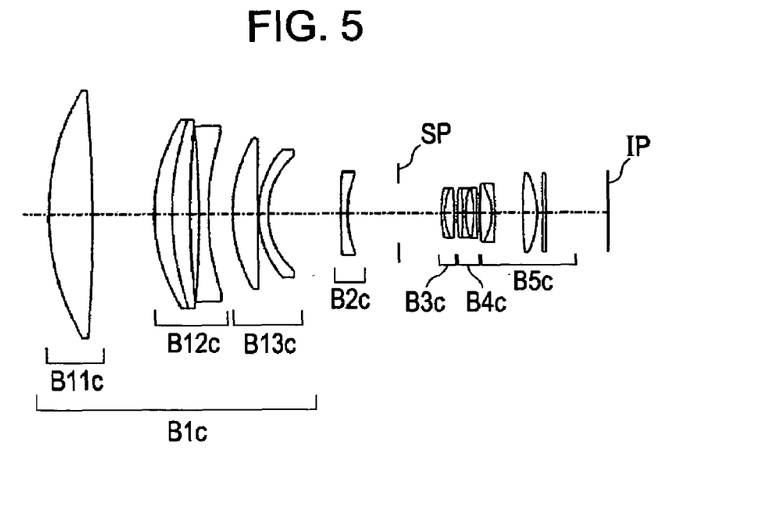
FIG. 5 is a sectional view of a lens system according to a third exemplary embodiment of the present invention.
Figure 6:
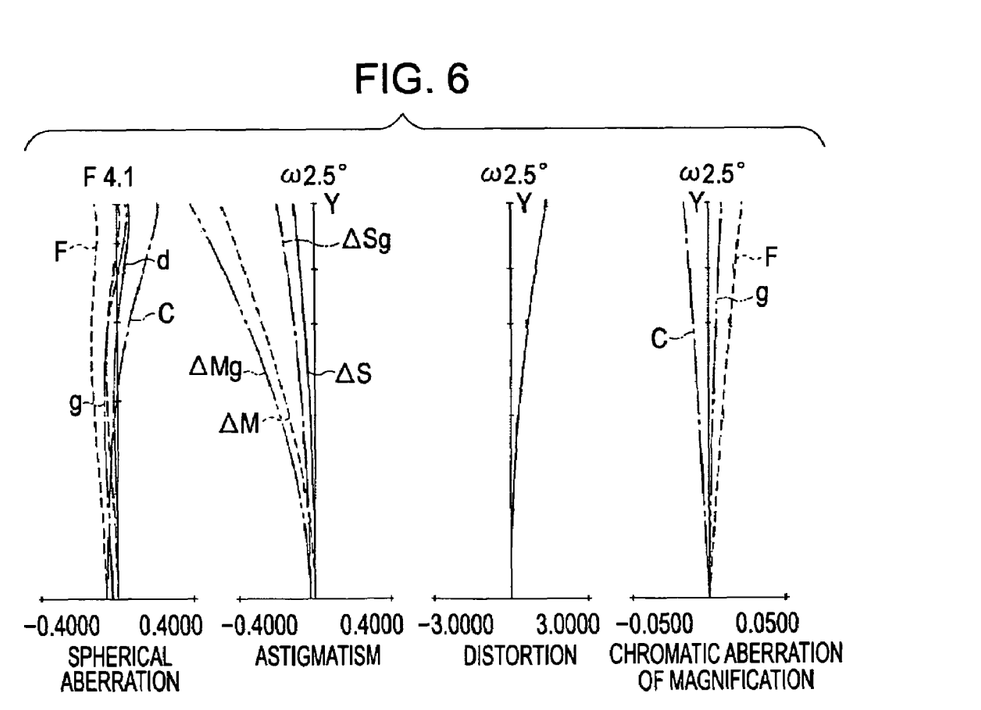
FIG. 6 is an aberration graph of an object at infinity according to the third exemplary embodiment of the present invention.
Figure 7:
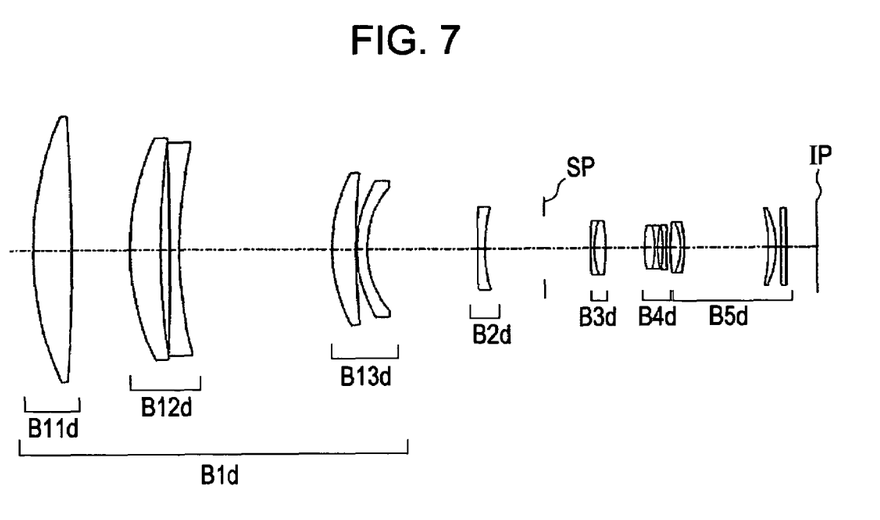
FIG. 7 is a sectional view of a lens system according to a fourth exemplary embodiment of the present invention.
Figure 8:
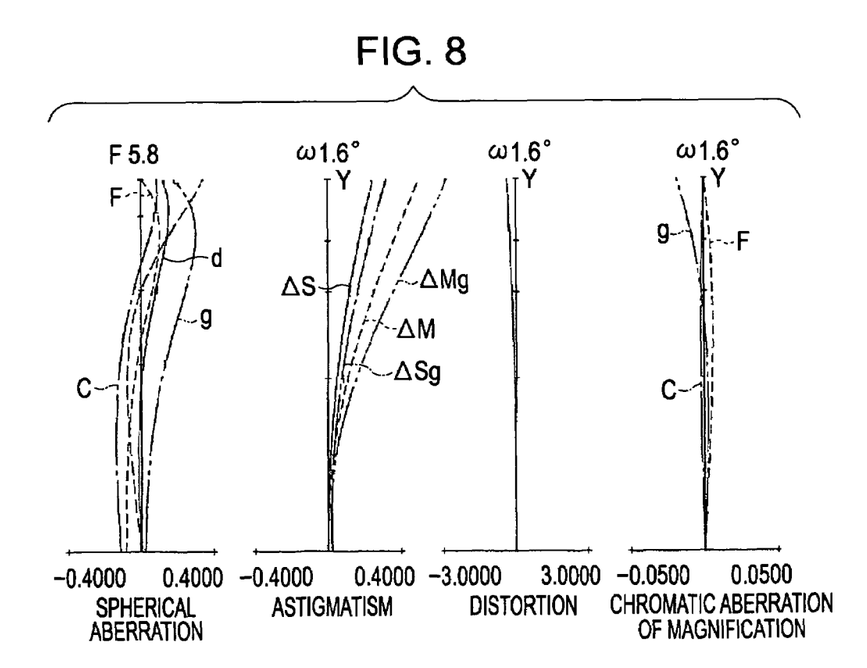
FIG. 8 is an aberration graph of an object at infinity according to the fourth exemplary embodiment of the present invention.

FIG. 1 is a sectional view of a lens system according to a first exemplary embodiment of the present invention. FIG. 2 is an aberration graph when an object distance is infinity according to the first exemplary embodiment of the present invention. FIG. 3 is a sectional view of a lens system according to a second exemplary embodiment of the present invention. FIG. 4 is an aberration graph when an object distance is infinity according to the second exemplary embodiment of the present invention. FIG. 5 is a sectional view of a lens system according to a third exemplary embodiment of the present invention. FIG. 6 is an aberration graph when an object distance is infinity according to the third exemplary embodiment of the present invention. FIG. 7 is a sectional view of a lens system according to a fourth exemplary embodiment of the present invention. FIG. 8 is an aberration graph when an object distance is infinity according to the fourth exemplary embodiment of the present invention.

In the sectional views of the lenses, the left side is adjacent to an object (front side) and the right side is adjacent to an image plane (rear side). Imaging optical systems of the following exemplary embodiments are used for an image capturing apparatus.

In the sectional views shown in FIGS. 1, 3, 5, and 7, a front lens unit B1$a$-$d$ can have a positive refractive power (first lens unit), a second lens unit B2$a$-$d$ can have a negative refractive power, a third lens unit B3$a$-$d$ can have a positive refractive power, a fourth lens unit B4$a$-$d$ can have a negative refractive power, and a fifth lens unit B5$a$-$d$ can have a positive refractive power. As used herein, the term lens unit does not necessarily include a plurality of lenses, but includes at least one lens.

The third lens unit B3$a$-$d$, the fourth lens unit B4$a$-$d$, and the fifth lens unit B5$a$-$d$ form a rear group RB. The front lens unit B1$a$-$d$ includes an eleventh lens unit B11$a$-$d$ which includes a single lens which can have a positive refractive power, a twelfth lens unit B12$a$-$d$, which can have a diffractive optical element which can have a positive refractive power, and a lens unit B13$a$-$d$ disposed in that order from the front to the back of the lens unit B1$a$-$d$. The air gap between the eleventh lens unit B11$a$-$d$ and the twelfth lens unit B12$a$-$d$ can be the largest while the air gap between the twelfth lens unit B12$a$-$d$ and the lens unit B13$a$-$d$ can be the second largest in the lens unit B1$a$-$d$. The optical system also includes an aperture stop SP. Focusing from an object at infinity to an object at a close-up point can be performed by moving the second lens unit B2$a$-$d$ towards the image plane. Additionally, by moving the fourth lens unit B4$a$-$d$ so that the fourth lens unit has a component in a direction substantially perpendicular to the optical axis, the image is displaced. Thus, blurring of the image due to shaking of the camera can be reduced.

The optical system further includes a diffractive optical part DOE, which can have a diffraction grating (e.g., formed of a UV curable resin) on a surface of a lens. Here, a diffractive optical element includes an optical member, such as a lens or a flat plate, and the diffractive optical part DOE formed on the surface of the optical member.

In the spherical aberration graphs shown in FIGS. 2, 4, 6, and 8, a solid line represents d-line, a double-dashed chain line represents g-line, a dashed line represents C-line, a dotted line represents F-line, and a chained line represents a sine condition. In the astigmatism graphs shown in FIGS. 2, 4, 6, and 8, a solid line represents a sagittal ray and a dotted line represents a meridional ray. In the chromatic aberration of magnification graphs shown in FIGS. 2, 4, 6, and 8, a double-dashed chain line represents g-line, a dashed line represents C-line, and a dotted line represents F-line.

In this exemplary embodiment, the diffractive optical part DOE is provided to the twelfth lens unit B12$a$ that has equivalently large heights of incoming on-axis and off-axis rays from the optical axis, that is, that has an equivalently large distance between the optical axis and the outermost ray of the rays focused at any image height. Thus, the axial aberration and the chromatic aberration of magnification are effectively corrected and/or reduced.

The characteristic of the diffractive optical part DOE is now herein described.

The diffractive optical part DOE has an optical characteristic different from refraction caused by known glass or plastic. That is, the diffractive optical part DOE has a negative dispersion characteristic and an extraordinary partial dispersion characteristic. For example, the Abbe number of the diffractive optical part DOE is −3.45 and the partial dispersion ratio θgf is 0.296.

By using these optical characteristics, the chromatic aberrations of the imaging optical system can be adequately corrected or reduced.

According to an exemplary embodiment of the present invention, the pitch of the diffractive optical element used for the imaging optical system can be changed towards the periphery thereof from the center of the optical axis so that the diffractive optical element provides the effect of an aspherical surface.

In a substantial portion of the exemplary embodiments of the present invention, by providing the diffractive optical part on a surface adjacent to an object and having a convex shape, angles (incident angles) of all the rays traveling towards the image plane of the imaging optical system and entering the diffractive optical part become small, so that high diffraction efficiency is maintained.

According to an exemplary embodiment of the present invention, the diffractive optical element can be manufactured by attaching a UV curable resin layer serving as a diffractive optical surface to an optical surface (lens surface). This manufacturing method is known as a method of manufacturing a replica of an aspherical surface.

Some types of UV curable resin have poor resistance to ultraviolet (UV) light. Therefore, in at least one exemplary embodiment, a lens, which can have the diffractive optical part DOE which is treated with a UV protection coating Ra on the surface remote to an object (i.e., on the light incident side), is used in the optical system.

A manufacturing method of a diffractive optical element according to this exemplary embodiment is described next with reference to the first exemplary embodiment shown in FIG. 1. Here, a reflection preventing coating can be applied on one surface of a lens G12$a$ and one surface of a lens G12$b$ having no replica treatment by the method of vacuum evaporation coating.

Subsequently, replica diffraction gratings are formed on the other surface of the lens G12$a$ and the other surface of the lens G12$b$ using replica diffraction grating molds having predetermined shapes (not shown). Since the replica diffraction gratings can be formed of a UV curable resin material, ultraviolet light is emitted from a lens surface remote from the replica diffraction grating molds when molding the replica diffraction gratings.

Accordingly, in at least one exemplary embodiment, a glass material for a replica base is a material, which can have a high UV transmission ratio, and the lens surface opposite to the replica forming lens surface is treated with a coating, which can have a high UV transmission ratio. By increasing the UV transmission ratio, the curing time of the resin can be reduced, thereby reducing associated problems, such as the occurrence of curing defects of the resin and surface precision defects of the diffraction grating. Additionally, to increase resistance to UV light, another method for blocking UV light is provided in addition to the lens G12$a$ and the lens G12$b$, which are replica forming lenses.

In conventional imaging optical systems, the device for blocking UV light is provided as a protection filter having no refractive power. Accordingly, the number of optical components of the optical systems increases, and therefore, the total length of the optical systems increases.

According to this exemplary embodiment, a UV protection coating can be applied to either one of the surfaces of a lens (on the object side or on the image side) in the eleventh lens unit B11$a$-$d$, which is the closest to an object. Thus, an increase in the total length of the optical system is prevented. Additionally, the film serving as the device configured to block UV light can be multilayered so as to prevent and/or reduce the reflection of light in the visible light range.

In the exemplary embodiments of the present invention, let L1 denote the distance between the eleventh lens unit B11$a$-$d$ and the twelfth lens unit B12$a$-$d$, OTL denote the total optical length (i.e., the distance between a first lens surface and the image plane), f11 denote the focal length of the eleventh lens unit B11$a$-$d$, f denote the focal length of the entire optical system when the object distance is infinity, RD denote the radius of curvature of the surface, which can have the diffractive optical part, L denote the distance between the diffractive optical part and the image plane, $\phi$D denote the effective diameter of the diffractive optical part, FNoT denote the F number, fd denote the focal length of the diffractive optical part based on the diffraction of the diffracting surface, and $\theta$d denote the maximum absolute value of an angle between a ray incident on the diffractive optical part and the normal line of the surface having diffracting unit. Then, at least one of the following conditional expressions can be satisfied:

$$0.05 < L1/OTL < 0.2 \quad (1)$$

$$0.35 < f11/f < 0.48 \quad (2)$$

$$0.55 < RD/L < 2 \quad (3)$$

$$0.70 < \phi D \times FNoT/f < 0.82 \quad (4)$$

$$10 < fd/f < 100 \quad (5)$$

$$\theta d < 12°. \quad (6)$$

The effective diameter means a diameter of light flux passed through the optical element (e.g., refractive element, or diffractive optical element), that is to say, a diameter of an area through which light flux to be guided to the image plane passes.

The technical meaning of the above-described conditional expressions is now herein described.

Conditional expression (1) defines the ratio of the air gap L1 between the eleventh lens unit B11$a$-$d$ and the twelfth lens unit B12$a$-$d$, which can have the diffractive optical part to the total optical length (i.e., the distance between a first lens surface that is the closest to the object and the image plane) OTL. This conditional expression (1) primarily reduces the flair caused by light unnecessary to photography being emitted to the edge of the diffraction grating while maintaining the sufficient effect of correcting and/or reducing the chromatic aberration. If the air gap L1 between the eleventh lens unit B11 and the twelfth lens unit B12$a$-$d$ exceeds the lower limit of conditional expression (1) and becomes too small, the effect of correcting and/or reducing the chromatic aberration caused by the refraction becomes large. However, the occurrence of the flair increases. In contrast, if the air gap L1 between the eleventh lens unit B11$a$-$d$ and the twelfth lens unit B12$a$-$d$ exceeds the upper limit of conditional expression (1) and becomes too large, the occurrence of the flair decreases. However, the effect of correcting and/or reducing the chromatic aberration caused by the refraction becomes small.

Conditional expression (2) defines the ratio of the focal length of the eleventh lens unit B11$a$-$d$, which is the closest to the object among the front lens unit B1$a$-$d$, to the focal length of the entire optical system when the object distance is infinity. If this ratio exceeds the lower limit of conditional expression (2) and the positive refractive power of the front lens unit B1$a$-$d$ becomes too high, the total optical length can be easily reduced and the outer diameter of a lens disposed at a position closer to the image plane than the eleventh lens unit B11$a$-$d$ can be easily reduced. Also, the weight of the lens can be easily reduced. However, the occurrence of spherical aberration and coma aberration can increase, thus decreasing the optical performance.

In contrast, if this ratio exceeds the upper limit of conditional expression (2) and the positive refractive power of the front lens unit B1$a$-$d$ becomes too low, these aberrations can be easily corrected and/or reduced. However, the increase in the total optical length also increases the outer diameter of a lens disposed at a position closer to the image plane than the eleventh lens unit B11a-d. Thus, the weight of the lens is increased.

Conditional expression (3) defines the ratio of the radius of curvature of the surface, which can have the diffractive optical part, to the distance between the diffractive optical part and the image plane. If this ratio exceeds the lower limit of conditional expression (3) and the radius of curvature of the surface, which can have the diffractive optical part, becomes too small or if this ratio exceeds the upper limit of conditional expression (3) and the radius of curvature of the surface, which can have the diffractive optical part, becomes too large, the angle between a ray incident on the diffractive optical part and the normal line of the surface, which can have the diffractive optical part, increases, and therefore, the diffraction efficiency decreases. Furthermore, when the rays reaching the image plane are incident on the edge portion of the diffraction grating, the edge portion can function as a secondary light source that generates a large amount of flair. The flair components decrease the optical performance when a photo is taken under backlighting conditions.

Conditional expression (4) defines the ratio of the effective diameter of the diffractive optical part to the diameter of the entrance pupil when the object distance is infinity. If this ratio exceeds the lower limit of conditional expression (4) and the effective diameter of the diffractive optical part becomes too small, the outer diameter of the lens, which can have the diffractive optical part, and the outer diameter of a lens disposed at a position closer to the image plane than the diffractive optical part decrease, and therefore, the weight of the optical system decreases. Additionally, the decrease in the diameter of the diffractive optical part facilitates the process of the diffracting grating. However, the occurrence of spherical aberration and coma aberration increases, thus decreasing the optical performance.

In contrast, if this ratio exceeds the upper limit of conditional expression (4) and the effective diameter of the diffractive optical part becomes too large, these aberrations can be easily corrected and/or reduced. However, the outer diameter of the lens, which can have the diffractive optical part, and the outer diameter of a lens disposed at a position closer to the image plane than the diffractive optical part increase, and therefore, the process of the diffracting grating becomes difficult.

Conditional expression (5) defines the ratio of the focal length fd (the reverse of power) defined by the diffraction of the diffractive optical part included in the twelfth lens unit B12a-d of the front lens unit to the focal length of the entire optical system when the object distance is infinity. If this ratio exceeds the lower limit of conditional expression (5) and the focal length fd becomes too small (the diffractive power of the diffractive optical part becomes too high), axial chromatic aberration is particularly overcorrected, and therefore, the optical performance is decreased. In contrast, if this ratio exceeds the upper limit of conditional expression (5) and the focal length fd becomes too large (the diffractive power of the diffractive optical part becomes too low), the axial chromatic aberration is particularly undercorrected, and therefore, the optical performance is decreased.

Conditional expression (6) defines the maximum angle of incidence of a ray entering the diffractive optical part. If this angle of incidence θd exceeds the upper limit of conditional expression (6) and the angle of incidence θd becomes too large, the diffraction efficiency decreases, and therefore, the optical performance is decreased.

It is noted that the following conditions can also be satisfied:

$$0.055 < L1/OTL < 0.15 \quad (1a)$$

$$0.36 < f11/f < 0.46 \quad (2a)$$

$$0.57 < RD/L < 1.5 \quad (3a)$$

$$0.72 < \phi D \times FNoT/f < 0.81 \quad (4a)$$

$$15 < fd/f < 80 \quad (5a)$$

$$\theta d < 11.5°. \quad (6a)$$

In the first exemplary embodiment, many materials can be used for the lenses, for example FK5™ can be used for first, second, third, and fifth lenses numbered from an object to the image side. In the second exemplary embodiment, many materials can be used for the lenses, for example FK5 can be used for first, second, fourth, and seventh lenses numbered from an object to the image side. In the third exemplary embodiment, many materials can be used for the lenses, for example FK5 can be used for first, second, third, fifth, ninth, and fifteenth lenses numbered from an object to the image side. In the fourth exemplary embodiment, FK5 can be used for first, second, and fourth lenses numbered from an object to the image side.

Thus, by using a lens material, which can have a low specific gravity for the front lens unit which can have a large volume, the total weight of the lenses is decreased while correcting and/or reducing chromatic aberrations. For example, the lens material FK5 has a slight extraordinary partial dispersion characteristic. Therefore, this material facilitates correcting and/or reducing the chromatic aberrations.

An exemplary structure of the diffractive optical part according to at least one exemplary embodiment is described next.

Figure 9:
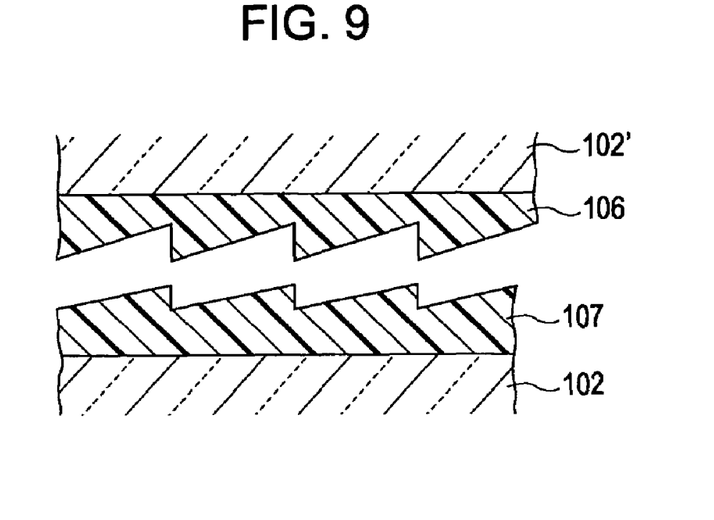
FIG. 9 illustrates a diffractive optical element according to an exemplary embodiment of the present invention.
Figure 11:
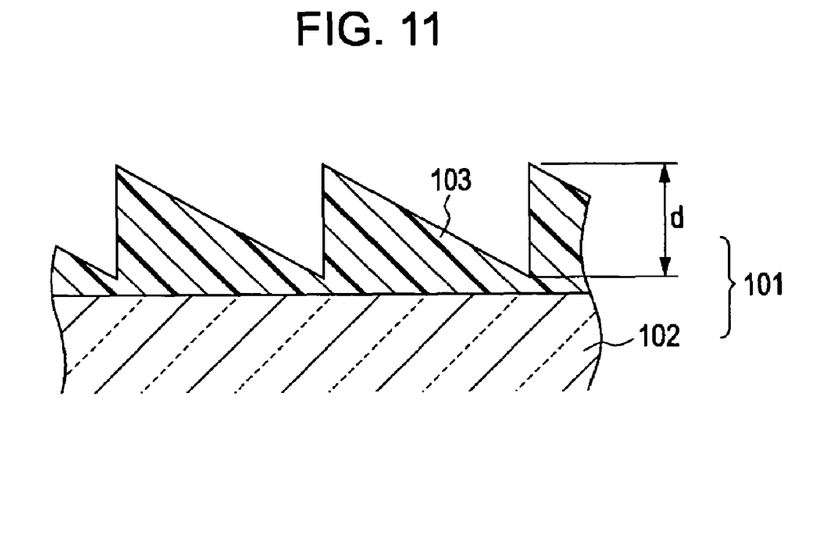
FIG. 11 illustrates a diffractive optical element according to an exemplary embodiment of the present invention.

As illustrated in FIG. 9, the diffractive optical part can have a two layered structure in which a diffracting grating 106 is matched to a diffracting grating 107 with an air gap therebetween. Alternatively, as illustrated in FIG. 11, the diffractive optical part can have a single layered structure including a diffracting grating 103 of a kinoform (saw-toothed) shape. Alternatively, as illustrated in FIG. 13, the diffractive optical part can have a two layered structure in which two diffracting gratings 104 and 105 which can have variable or the same thicknesses are laminated.

Figure 13:
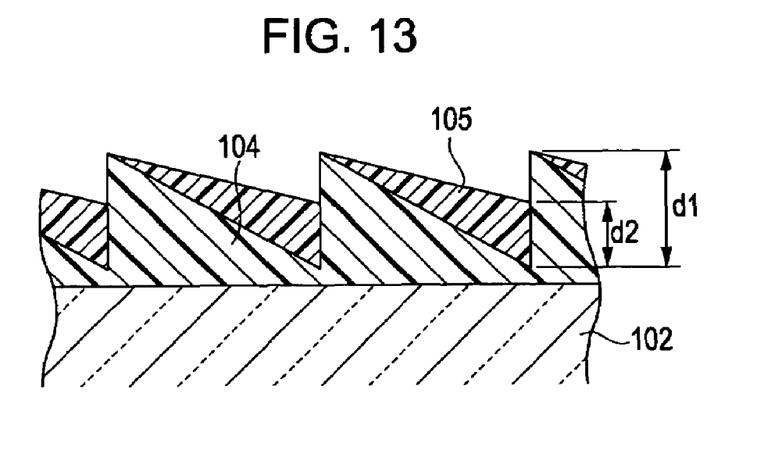
FIG. 13 illustrates a diffractive optical element according to an exemplary embodiment of the present invention.

In FIGS. 9, 11, and 13, base materials 102 and 102' are shown.

In a diffractive optical element shown in FIG. 9, the first diffracting grating 106 can be formed of various materials for example a UV curable resin on the base material (lens or flat plate) 102' while the second diffracting grating 107 can also be formed of various materials for example a UV curable resin on the base material (lens or flat plate) 102.

Figure 10:
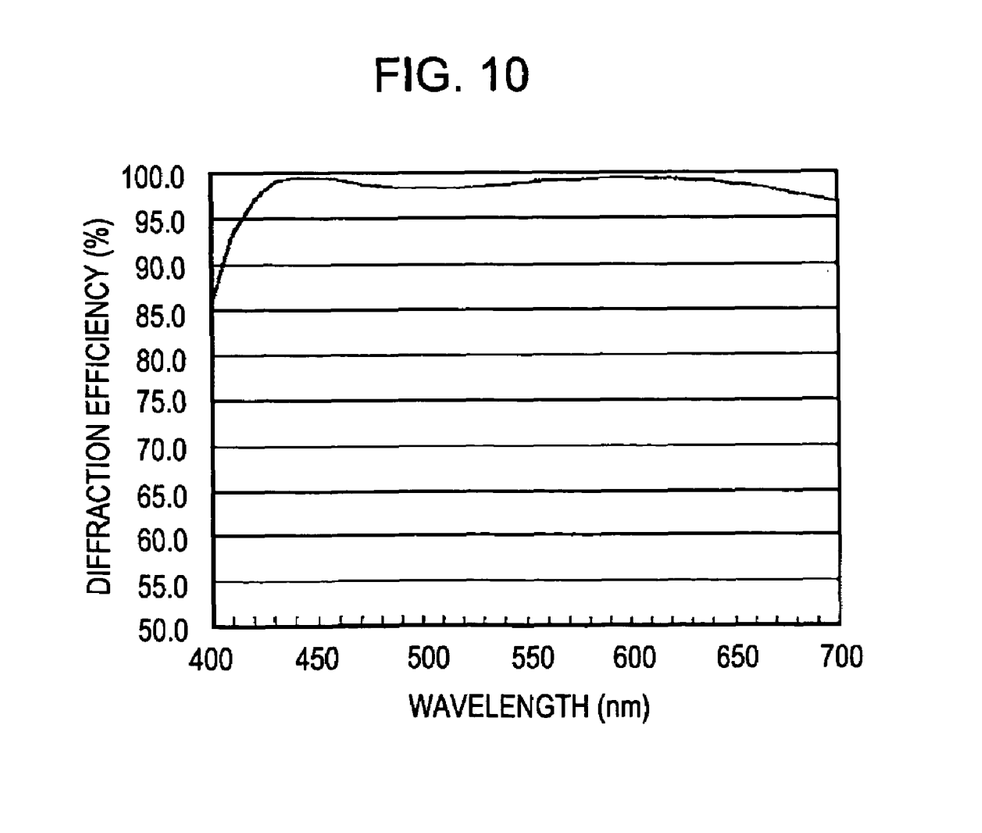
FIG. 10 is a graph of a wavelength dependent characteristic of the diffractive optical element according to an exemplary embodiment of the present invention.

FIG. 10 is a schematic graph of the wavelength dependent characteristic of diffraction efficiency of a first order diffracted ray in the diffractive optical part using the two diffraction gratings 106 and 107 shown in FIG. 9.

As can be seen from FIG. 10, the diffraction efficiency of the designed order is as high as 95% or more over the entire used wavelength range.

Figure 12:
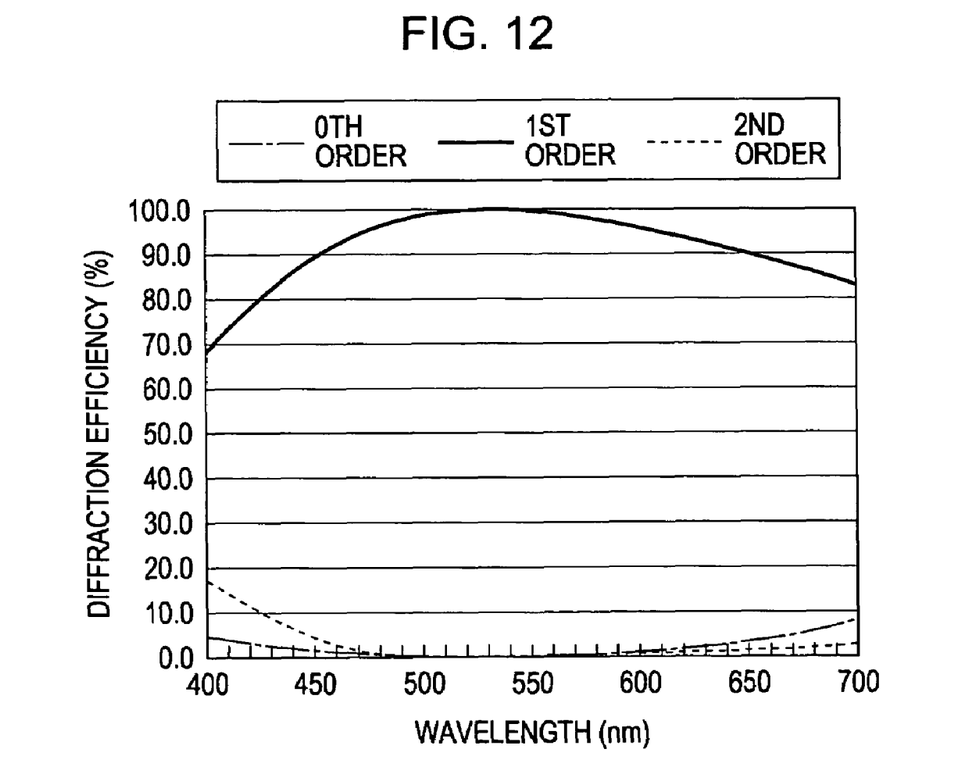
FIG. 12 is a graph of a wavelength dependent characteristic of the diffractive optical element according to the embodiment of the present invention.

FIG. 12 is a schematic graph of the wavelength dependent characteristic of the diffraction efficiency of a first order diffracted ray in the diffractive optical part, which can have a single layer structure shown in FIG. 11. In an example of an actual structure of the diffractive optical element, a UV curable resin can be applied to a surface of a base material (glass) 102. The diffracting grating 103, which can have a grating thickness of d that results in the diffraction efficiency of 100% for the first order diffracted ray at a wavelength of 530 nm, is formed in the UV curable resin.

As can be seen from FIG. 12, the diffraction efficiency of the design order decreases with distance from a wavelength of 530 nm, while the diffraction efficiency of the zeroth order and the second order which are close to the design order increases with distance from a wavelength of 530 nm.

The increase in the diffraction efficiency of the diffracted ray of the orders other than the design order causes flair that can decrease the resolution of the optical system.

Figure 14:
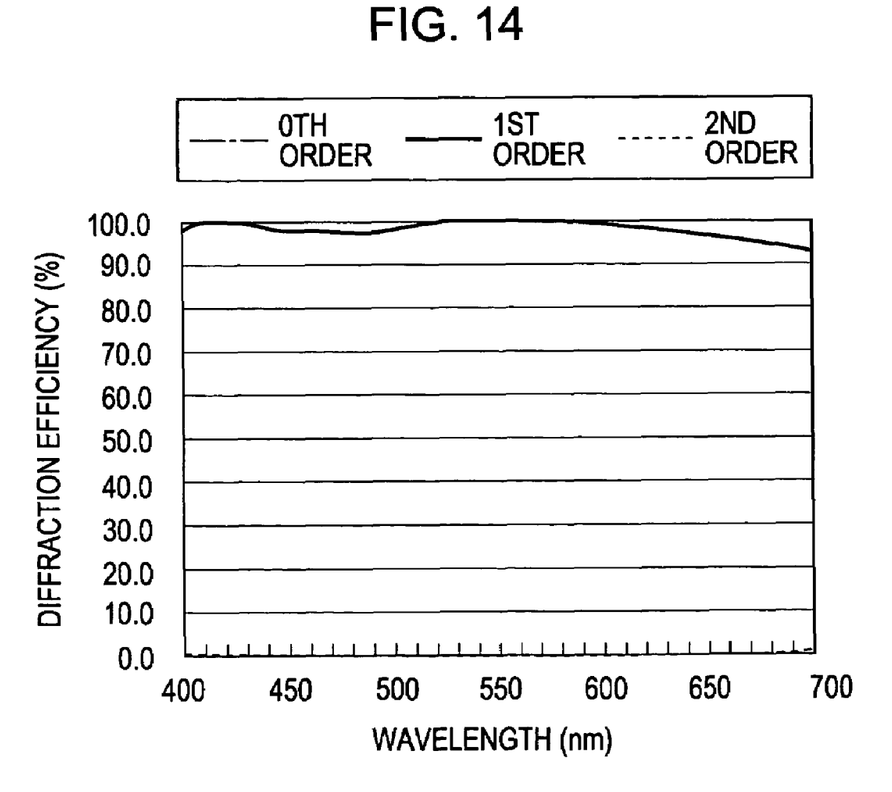
FIG. 14 is a graph of a wavelength dependent characteristic of the diffractive optical element according to the embodiment of-the present invention.

FIG. 14 is a schematic graph of the wavelength dependent characteristic of the diffraction efficiency of a first-order diffracted ray in the diffractive optical part using the two laminated diffraction gratings 104 and 105 shown in FIG. 13.

In the diffractive optical part shown in FIG. 13, the first diffraction grating 104 can be formed (e.g., of a UV curable resin (nd=1.499 and vd=54)) on the base material 102. Subsequently, the second diffraction grating 105 can be formed (e.g., of another UV curable resin (nd=1.598 and vd=28)) on the first diffraction grating 104. In this non limiting example the combination of these materials, a grating thickness d1 of the first diffraction grating 104 is set to 13.8 μm while a grating thickness d2 of the second diffraction grating 105 is set to 10.5 μm.

As can be seen from FIG. 14, the diffractive optical part, which can have a laminated structure, provides the diffraction efficiency of the design order as high as 95% or more over the entire used wavelength range.

An embodiment of a single lens reflex (SLR) camera system using the imaging optical system according to at least one exemplary embodiment is described next with reference to FIG. 15.

Figure 15:
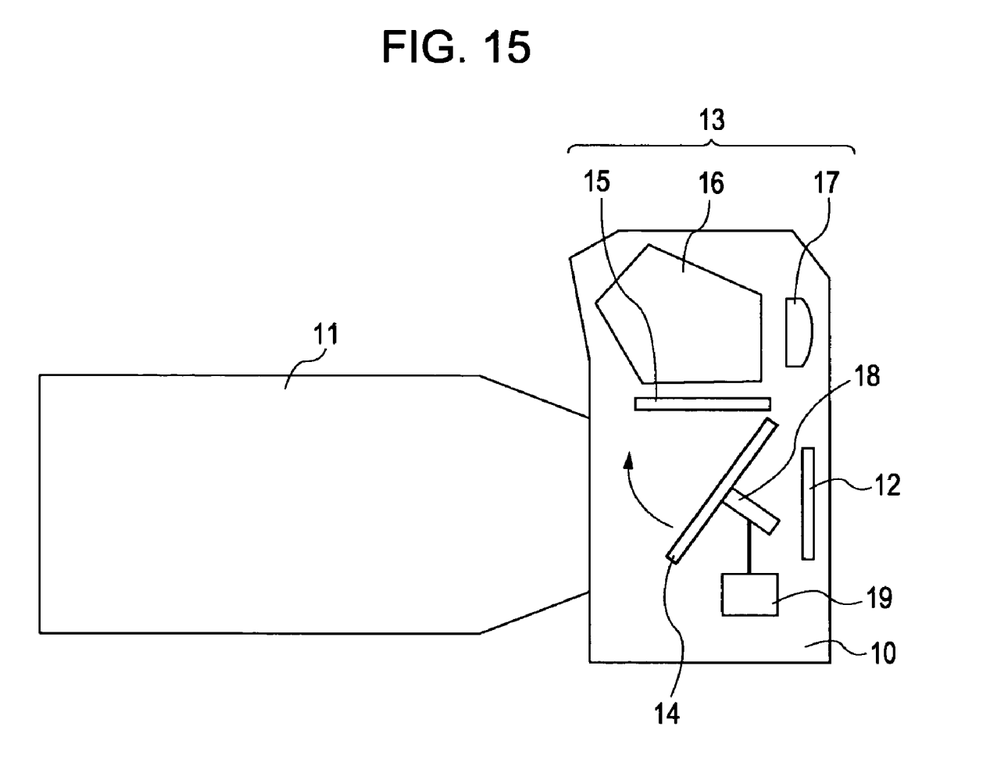
FIG. 15 is a schematic diagram of an image capturing apparatus according to an exemplary embodiment of the present invention.

As illustrated in FIG. 15, an SLR camera body 10 is attached to an interchangeable lens 11 that includes the imaging optical system according to at least one exemplary embodiment. Recording means 12 (e.g., a film or image capturing device) records a subject image obtained through the interchangeable lens 11. A finder optical system 13 is used to observe the subject image obtained through the interchangeable lens 11. A quick return mirror 14 turns so as to transmit the subject image obtained through the interchangeable lens 11 to the recording means 12 or the finder optical system 13 while switching the recording means 12 to the finder optical system 13 and vice versa.

When the subject image is observed from the finder optical system 13, the subject image is focused on a focusing plate 15 via the quick return mirror 14. Thereafter, the subject image is changed to an upright image by a penta prism 16 and is magnified by an eyepiece lens system 17. Thus, the subject image can be observed.

When the subject image is captured, the quick return mirror 14 turns in a direction shown by an arrow so that the subject image is focused on the recording means 12 and is stored. At that time, a sub mirror 18 and a focusing detection unit 19 are used.

As described above, by applying the imaging optical system according to at least one exemplary embodiment to an image capturing apparatus, such as an interchangeable lens for an SLR camera, the image capturing apparatus, which can have a high optical performance, can be achieved.

It should be appreciated that the present invention can be applied to an SLR camera having no quick return mirror.

According to the above-described exemplary embodiments, by disposing the diffractive optical part at an appropriate position in the optical system, a compact and lightweight imaging optical system can be achieved that has an improved optical performance in which the diffractive optical part can be formed more easily and flair caused by the edge of a grating unit of the diffractive optics and chromatic aberration can be reduced to a minimum level. In addition, an image capturing apparatus including this imaging optical system can be achieved.

Numerical examples of some exemplary embodiments of the present invention are now herein described. In these numerical examples of some exemplary embodiments, i denotes the order numbered from the object. ri denotes the radius of curvature of the ith optical surface, and di denotes the thickness of the ith lens and the air gap. ni and vi denote the index of refraction and the Abbe number of a material of the ith optical material for d-line, respectively.

The shape of the diffractive optical part is expressed by the following equation:

$$\Phi(h) = 2\pi\lambda_0(C1 \cdot h^2 + C2 \cdot h^4 + C3 \cdot h^6 + \ldots)$$

where $\Phi(h)$=phase, $\lambda_0$=standard wavelength (d-line), h=height from the optical axis, and C1, C2, C3, . . . =aspherical coefficients at respective orders.

Furthermore, f denotes the focal length. Fno denotes the F number. ω denotes the half angle of field. BF denotes the back focus. The last two surfaces having no refractive power in each numerical example of some exemplary embodiments denote the surfaces of a glass block (dummy surfaces) used for a design. Table 1 illustrates a relationship between the above-described conditional expressions and the numerical embodiments.

| Numerical Embodiment 1 f = 780.0 Fno = 1:5.8 2ω = 3.2° | | | |
|---|---|---|---|
| r1 = 183.804 | d1 = 20.13 | n1 = 1.48749 | v1 = 70.2 |
| r2 = −601.516 | d2 = 45.34 | | |
| r3 = 125.453 | d3 = 9.10 | n2 = 1.48749 | v2 = 70.2 |
| r4 = 275.000 (Diffractive Surface) | d4 = 8.19 | n3 = 1.48749 | v3 = 70.2 |
| r5 = 1443593.587 | d5 = 2.72 | | |
| r6 = −540.021 | d6 = 4.80 | n4 = 1.83481 | v4 = 42.7 |
| r7 = 183.239 | d7 = 58.63 | | |
| r8 = 74.687 | d8 = 11.12 | n5 = 1.48749 | v5 = 70.2 |
| r9 = 363.443 | d9 = 0.49 | | |
| r10 = 71.399 | d10 = 5.00 | n6 = 1.69680 | v6 = 55.5 |
| r11 = 49.913 | d11 = 41.54 | | |
| r12 = 853.454 | d12 = 3.50 | n7 = 1.43387 | v7 = 95.1 |
| r13 = 84.048 | d13 = 51.65 | | |
| r14 = 0.000(Aperture) | d14 = 24.20 | | |
| r15 = 112.962 | d15 = 1.72 | n8 = 1.84666 | v8 = 23.9 |
| r16 = 31.965 | d16 = 4.68 | n9 = 1.51742 | v9 = 52.4 |
| r17 = −74.630 | d17 = 1.32 | | |
| r18 = 59.912 | d18 = 3.66 | n10 = 1.74950 | v10 = 35.3 |
| r19 = −56.359 | d19 = 1.72 | n11 = 1.72916 | v11 = 54.7 |
| r20 = 46.800 | d20 = 1.52 | | |
| r21 = −101.849 | d21 = 1.72 | n12 = 1.83481 | v12 = 42.7 |
| r22 = 63.831 | d22 = 2.09 | | |
| r23 = 170.199 | d23 = 4.44 | n13 = 1.63980 | v13 = 34.5 |
| r24 = −22.060 | d24 = 1.85 | n14 = 1.71300 | v14 = 53.9 |
| r25 = −145.542 | d25 = 43.14 | | |
| r26 = −133.256 | d26 = 4.70 | n15 = 1.51742 | v15 = 52.4 |
| r27 = −44.932 | d27 = 2.36 | | |
| r28 = ∞ | d28 = 2.64 | n16 = 1.51633 | v16 = 64.1 |
| r29 = ∞ | BF = 96.82 | | |

Numerical Embodiment 2
f = 590.0 FNo = 1:4.1 2ω = 4.2°

| | | | |
|---|---|---|---|
| r1 = 138.257 | d1 = 26.59 | n1 = 1.48749 | ν1 = 70.2 |
| r2 = −701.408 | d2 = 31.83 | | |
| r3 = 111.640 | d3 = 9.11 | n2 = 1.48749 | ν2 = 70.2 |
| r4 = 200.000 | d4 = 6.53 | n3 = 1.51633 | ν3 = 64.1 |
| (Aspherical Surface) | | | |
| r5 = 568.750 | d5 = 5.89 | | |
| r6 = −419.970 | d6 = 4.00 | n4 = 1.83481 | ν4 = 42.7 |
| r7 = 140.715 | d7 = 11.99 | | |
| r8 = 89.279 | d8 = 18.63 | n5 = 1.48749 | ν5 = 70.2 |
| r9 = 4643.475 | d9 = 0.37 | | |
| r10 = 62.003 | d10 = 5.30 | n6 = 1.69680 | ν6 = 55.5 |
| r11 = 48.853 | d11 = 43.49 | | |
| r12 = 543.496 | d12 = 3.00 | n7 = 1.57501 | ν7 = 41.5 |
| r13 = 7749.702 | d13 = 1.50 | n8 = 1.48749 | ν8 = 70.2 |
| r14 = 83.522 | d14 = 35.31 | | |
| r15 = 0.000(Aperture) | d15 = 19.51 | | |
| r16 = 84.207 | d16 = 1.30 | n9 = 1.84666 | ν9 = 23.9 |
| r17 = 32.197 | d17 = 5.77 | n10 = 1.51742 | ν10 = 52.4 |
| r18 = −205.995 | d18 = 7.06 | | |
| r19 = 84.018 | d19 = 3.79 | n11 = 1.74950 | ν11 = 35.3 |
| r20 = −69.512 | d20 = 1.30 | n12 = 1.72916 | ν12 = 54.7 |
| r21 = 50.426 | d21 = 2.28 | | |
| r22 = −82.881 | d22 = 1.30 | n13 = 1.83481 | ν13 = 42.7 |
| r23 = 100.451 | d23 = 4.61 | | |
| r24 = 208.189 | d24 = 5.28 | n14 = 1.63980 | ν14 = 34.5 |
| r25 = −27.377 | d25 = 1.40 | n15 = 1.72916 | ν15 = 54.7 |
| r26 = −146.056 | d26 = 27.08 | | |
| r27 = 3367.007 | d27 = 5.50 | n16 = 1.51742 | ν16 = 52.4 |
| r28 = −52.555 | d28 = 2.38 | | |
| r29 = ∞ | d29 = 2.00 | n17 = 1.51633 | ν17 = 64.1 |
| r30 = ∞ | BF = 89.64 | | |

Numerical Embodiment 3
f = 493.4 FNo = 1:4.1 2ω = 5.0°

| | | | |
|---|---|---|---|
| r1 = 123.826 | d1 = 21.38 | n1 = 1.48749 | ν1 = 70.2 |
| r2 = −757.722 | d2 = 30.15 | | |
| r3 = 90.033 | d3 = 8.72 | n2 = 1.48749 | ν2 = 70.2 |
| r4 = 141.947 | d4 = 8.77 | n3 = 1.48749 | ν3 = 70.2 |
| (Diffractive Surface) | | | |
| r5 = 440.864 | d5 = 4.49 | | |
| r6 = −446.937 | d6 = 4.50 | n4 = 1.83400 | ν4 = 37.2 |
| r7 = 128.370 | d7 = 12.00 | | |
| r8 = 76.068 | d8 = 12.35 | n5 = 1.48749 | ν5 = 70.2 |
| r9 = 4330.731 | d9 = 0.31 | | |
| r10 = 49.713 | d10 = 4.50 | n6 = 1.64000 | ν6 = 60.1 |
| r11 = 38.649 | d11 = 35.82 | | |
| r12 = 298.988 | d12 = 3.20 | n7 = 1.43387 | ν7 = 95.1 |
| r13 = 53.126 | d13 = 25.00 | | |
| r14 = 0.000(Aperture) | d14 = 21.00 | | |
| r15 = 62.037 | d15 = 1.40 | n8 = 1.85026 | ν8 = 32.3 |
| r16 = 27.190 | d16 = 4.66 | n9 = 1.48749 | ν9 = 70.2 |
| r17 = −240.785 | d17 = 1.30 | | |
| r18 = 71.658 | d18 = 2.84 | n10 = 1.76182 | ν10 = 26.5 |
| r19 = −172.392 | d19 = 1.40 | n11 = 1.71300 | ν11 = 53.9 |
| r20 = 38.639 | d20 = 3.77 | | |
| r21 = −64.027 | d21 = 1.40 | n12 = 1.88300 | ν12 = 40.8 |
| r22 = 106.220 | d22 = 1.69 | | |
| r23 = 117.854 | d23 = 5.95 | n13 = 1.67270 | ν13 = 32.1 |
| r24 = −27.657 | d24 = 1.50 | n14 = 1.77250 | ν14 = 49.6 |
| r25 = −221.098 | d25 = 13.80 | | |
| r26 = 169.903 | d26 = 6.89 | n15 = 1.48749 | ν15 = 70.2 |
| r27 = −47.006 | d27 = 2.50 | | |
| r28 = ∞ | d28 = 1.67 | n16 = 1.51633 | ν16 = 64.1 |
| r29 = ∞ | BF = 59.25 | | |

Numerical Embodiment 4
f = 780.0 FNo = 1:5.8 2ω = 3.2°

| | | | |
|---|---|---|---|
| r1 = 174.843 | d1 = 19.84 | n1 = 1.48749 | ν1 = 70.2 |
| r2 = −951.762 | d2 = 30.00 | | |
| r3 = 135.753 | d3 = 15.66 | n2 = 1.48749 | ν2 = 70.2 |
| r4 = 400.000 | d4 = 4.79 | | |
| (Diffractive Surface) | | | |
| r5 = −1504.017 | d5 = 4.80 | n3 = 1.83481 | ν3 = 42.7 |
| r6 = 233.061 | d6 = 78.72 | | |
| r7 = 85.712 | d7 = 12.17 | n4 = 1.48749 | ν4 = 70.2 |
| r8 = 423.114 | d8 = 0.49 | | |
| r9 = 70.264 | d9 = 5.00 | n5 = 1.69680 | ν5 = 55.5 |
| r10 = 50.624 | d10 = 56.86 | | |
| r11 = 672.609 | d11 = 3.50 | n6 = 1.43387 | ν6 = 95.1 |
| r12 = 75.917 | d12 = 30.31 | | |
| r13 = 0.000(Aperture) | d13 = 24.20 | | |
| r14 = 133.707 | d14 = 1.72 | n7 = 1.84666 | ν7 = 23.9 |
| r15 = 37.012 | d15 = 5.91 | n8 = 1.51742 | ν8 = 52.4 |
| r16 = −135.367 | d16 = 20.00 | | |
| r17 = 79.937 | d17 = 5.01 | n9 = 1.74950 | ν9 = 35.3 |
| r18 = −43.443 | d18 = 1.72 | n10 = 1.72916 | ν10 = 54.7 |
| r19 = 42.446 | d19 = 2.75 | | |
| r20 = −74.526 | d20 = 1.72 | n11 = 1.83481 | ν11 = 42.7 |
| r21 = 106.601 | d21 = 2.09 | | |
| r22 = 90.975 | d22 = 5.19 | n12 = 1.63980 | ν12 = 34.5 |
| r23 = −30.531 | d23 = 1.85 | n13 = 1.71300 | ν13 = 53.9 |
| r24 = −74.543 | d24 = 43.14 | | |
| r25 = −102.722 | d25 = 3.89 | n14 = 1.51742 | ν14 = 52.4 |
| r26 = −47.721 | d26 = 2.36 | | |
| r27 = ∞ | d27 = 2.64 | n15 = 1.51633 | ν15 = 64.1 |
| r28 = ∞ | BF = 75.76 | | |

Indices of Refraction of Materials in Numerical Embodiment 1

| | d | g | c | f |
|---|---|---|---|---|
| G1 | 1.487490 | 1.495964 | 1.485344 | 1.492285 |
| G2 | 1.487490 | 1.495964 | 1.485344 | 1.492285 |
| G3 | 1.487490 | 1.495964 | 1.485344 | 1.492285 |
| G4 | 1.834807 | 1.859527 | 1.828974 | 1.848514 |
| G5 | 1.487490 | 1.495964 | 1.485344 | 1.492285 |
| G6 | 1.696797 | 1.712339 | 1.692974 | 1.705522 |
| G7 | 1.433870 | 1.439490 | 1.432480 | 1.437040 |
| G8 | 1.846660 | 1.893856 | 1.836554 | 1.871929 |
| G9 | 1.517417 | 1.529804 | 1.514444 | 1.524313 |
| G10 | 1.749500 | 1.776810 | 1.743260 | 1.764470 |
| G11 | 1.729157 | 1.745696 | 1.725101 | 1.738436 |
| G12 | 1.834807 | 1.859527 | 1.828974 | 1.848514 |
| G13 | 1.639799 | 1.663933 | 1.634375 | 1.652939 |
| G14 | 1.712995 | 1.729435 | 1.708974 | 1.722210 |
| G15 | 1.517417 | 1.529804 | 1.514444 | 1.524313 |
| G16 | 1.516330 | 1.526214 | 1.513855 | 1.521905 |

Indices of Refraction of Materials in Numerical Embodiment 2

| | d | g | c | f |
|---|---|---|---|---|
| G1 | 1.487490 | 1.495964 | 1.485344 | 1.492285 |
| G2 | 1.487490 | 1.495964 | 1.485344 | 1.492285 |
| G3 | 1.516330 | 1.526214 | 1.513855 | 1.521905 |
| G4 | 1.834807 | 1.859527 | 1.828974 | 1.848514 |
| G5 | 1.487490 | 1.495964 | 1.485344 | 1.492285 |
| G6 | 1.696797 | 1.712339 | 1.692974 | 1.705522 |
| G7 | 1.575006 | 1.592745 | 1.570902 | 1.584756 |
| G8 | 1.487490 | 1.495964 | 1.485344 | 1.492285 |
| G9 | 1.846660 | 1.893856 | 1.836554 | 1.871929 |
| G10 | 1.517417 | 1.529804 | 1.514444 | 1.524313 |

-continued

Indices of Refraction of Materials in Numerical Embodiment 2

|   | d | g | c | f |
|---|---|---|---|---|
| G11 | 1.749500 | 1.776810 | 1.743260 | 1.764470 |
| G12 | 1.729157 | 1.745696 | 1.725101 | 1.738436 |
| G13 | 1.834807 | 1.859527 | 1.828974 | 1.848514 |
| G14 | 1.639799 | 1.663933 | 1.634375 | 1.652939 |
| G15 | 1.729157 | 1.745696 | 1.725101 | 1.738436 |
| G16 | 1.517417 | 1.529804 | 1.514444 | 1.524313 |
| G17 | 1.516330 | 1.526214 | 1.513855 | 1.521905 |

Indices of Refraction of Materials in Numerical Embodiment 3

|   | d | g | c | f |
|---|---|---|---|---|
| G1 | 1.487490 | 1.495964 | 1.485344 | 1.492285 |
| G2 | 1.487490 | 1.495964 | 1.485344 | 1.492285 |
| G3 | 1.487490 | 1.495964 | 1.485344 | 1.492285 |
| G4 | 1.834000 | 1.862781 | 1.827376 | 1.849819 |
| G5 | 1.487490 | 1.495964 | 1.485344 | 1.492285 |
| G6 | 1.639999 | 1.653107 | 1.636730 | 1.647384 |
| G7 | 1.433870 | 1.439490 | 1.432480 | 1.437040 |
| G8 | 1.850259 | 1.884505 | 1.842582 | 1.868918 |
| G9 | 1.487490 | 1.495964 | 1.485344 | 1.492285 |
| G10 | 1.761821 | 1.799923 | 1.753567 | 1.782296 |
| G11 | 1.712995 | 1.729435 | 1.708974 | 1.722210 |
| G12 | 1.882997 | 1.910497 | 1.876560 | 1.898221 |
| G13 | 1.672700 | 1.700114 | 1.666607 | 1.687564 |
| G14 | 1.772499 | 1.791972 | 1.767798 | 1.783374 |
| G15 | 1.487490 | 1.495964 | 1.485344 | 1.492285 |
| G16 | 1.516330 | 1.526214 | 1.513855 | 1.521905 |

Indices of Refraction of Materials in Numerical Embodiment 4

|   | d | g | c | f |
|---|---|---|---|---|
| G1 | 1.487490 | 1.495964 | 1.485344 | 1.492285 |
| G2 | 1.487490 | 1.495964 | 1.485344 | 1.492285 |
| G3 | 1.834807 | 1.859527 | 1.828974 | 1.848514 |
| G4 | 1.487490 | 1.495964 | 1.485344 | 1.492285 |
| G5 | 1.696797 | 1.712339 | 1.692974 | 1.705522 |
| G6 | 1.433870 | 1.439490 | 1.432480 | 1.437040 |
| G7 | 1.846660 | 1.893856 | 1.836554 | 1.871929 |
| G8 | 1.517417 | 1.529804 | 1.514444 | 1.524313 |
| G9 | 1.749500 | 1.776810 | 1.743260 | 1.764470 |
| G10 | 1.729157 | 1.745696 | 1.725101 | 1.738436 |
| G11 | 1.834807 | 1.859527 | 1.828974 | 1.848514 |
| G12 | 1.639799 | 1.663933 | 1.634375 | 1.652939 |
| G13 | 1.712995 | 1.729435 | 1.708974 | 1.722210 |
| G14 | 1.517417 | 1.529804 | 1.514444 | 1.524313 |
| G15 | 1.516330 | 1.526214 | 1.513855 | 1.521905 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-138525 filed May 11, 2005, which is hereby incorporated by reference herein in its entirety.

What is claimed is:

1. An imaging optical system comprising:
a first lens unit having positive refractive power, the first lens unit including a first lens sub-unit comprising a single lens having a positive refractive power, a second lens sub-unit including a diffractive optical part and having a positive refractive power, and a third lens sub-unit having a negative refractive power, the first to third sub-units being disposed in this order from an object side to an image side; and
a second lens unit having a negative refractive power, the first lens unit and the second lens unit being disposed in this order from the object side to the image side;
wherein the diffractive optical part is convex towards the object and the following condition is satisfied:

$$0.05 < L1/OTL < 0.2$$

where L1 denotes a distance between the first lens sub-unit and the second lens sub-unit and OTL denotes the total optical length of the imaging optical system to the imaging plane.

2. The imaging optical system according to claim 1, wherein the following condition is satisfied:

$$0.35 < f11/f < 0.48$$

where f11 denotes the focal length of the first lens sub-unit and f denotes the focal length of the entire imaging optical system when the object distance is infinity.

3. The imaging optical system according to claim 1, wherein the following condition is satisfied:

$$0.55 < RD/L < 2$$

where RD denotes the radius of curvature of the surface having the diffractive optical part and L denotes the distance between the diffractive optical part and the image plane.

4. The imaging optical system according to claim 1, wherein the following condition is satisfied:

$$0.70 < \phi D \times FNoT/f < 0.82$$

where $\phi D$ denotes the effective diameter of the diffractive optical part, FNoT denotes the F number, and f denotes the focal length of the entire imaging optical system when the object distance is infinity.

5. The imaging optical system according to claim 1, wherein the following condition is satisfied:

$$10 < fd/f < 100$$

where fd denotes the focal length of the diffractive optical part based on the diffraction of the diffracting surface and f

TABLE 1

|   | Conditional Expressions | Lower Limit | Upper Limit | Numerical Embodiment 1 | Numerical Embodiment 2 | Numerical Embodiment 3 | Numerical Embodiment 4 |
|---|---|---|---|---|---|---|---|
| 1 | L1/OTL | 0.05 | 0.20 | 0.10 | 0.08 | 0.10 | 0.06 |
| 2 | f11/f | 0.35 | 0.48 | 0.37 | 0.41 | 0.45 | 0.39 |
| 3 | RD/L | 0.55 | 2 | 0.71 | 0.63 | 0.59 | 1.01 |
| 4 | $\phi D \times FNoT/f$ | 0.70 | 0.82 | 0.76 | 0.74 | 0.73 | 0.80 |
| 5 | fd/f | 10 | 100 | 22 | 23 | 21 | 23 |
| 6 | θd | — | 12 | 8 | 9 | 6 | 11 | denotes the focal length of the entire imaging optical system when the object distance is infinity.

6. The imaging optical system according to claim 1, wherein the following condition is satisfied:

$$\theta d < 12°$$

where θd denote the maximum absolute value of an angle between a ray incident on the diffractive optical part and the normal line of the surface having the diffractive optical part.

7. An image capturing apparatus comprising:
   a imaging optical system including a first lens unit having a positive refractive power and a second lens unit having a negative refractive power, the first lens unit and the second lens unit being disposed in this order from an object side to an image side, the first lens unit including a first lens sub-unit including a single lens having a positive refractive power, a second lens sub-unit including a diffractive optical part and having a positive refractive power, and a third lens sub-unit having a negative refractive power, the first to third sub-units being disposed in this order from the object side to the image side; and
   a solid-state image sensing element configured to receive an image formed by the imaging optical system;
   wherein the diffractive optical part is convex towards the object and the following condition is satisfied:

$$0.05 < L1/OTL < 0.2$$

where L1 denotes a distance between the first lens sub-unit and the second lens sub-unit and OTL denotes the total optical length of the imaging optical system to the imaging plane.

8. An imaging optical system comprising:
   a first lens unit having a positive refractive power;
   a second lens unit having a negative refractive power, the second lens unit being movable along the optical axis for focusing; and
   a rear lens unit including at least one rear sub lens unit;
   wherein the first lens unit, the second lens unit, and the rear lens unit are disposed in this order from an object side to an image side, and wherein the first lens unit includes a first lens sub-unit including a single lens having a positive refractive power, a second lens sub-unit including a diffractive optical part and having a positive refractive power, and a third lens sub-unit having a negative refractive power, the first to third lens sub-units are disposed in this order from the object side to the image side, and an air gap between the first lens sub-unit and the second lens sub-unit is the largest in the first lens unit while an air gap between the second lens sub-unit and the third lens sub-unit is the second largest in the first lens unit, and wherein the diffractive optical part is convex towards the object side and the following condition is satisfied:

$$0.05 < L1/OTL < 0.2$$

where L1 denotes a distance between the first lens sub-unit and the second lens sub-unit and OTL denotes the total optical length of the imaging optical system to the imaging plane.

9. The imaging optical system according to claim 8, wherein the rear lens sub-unit is configured to displace the position of an image by moving so that the rear lens sub-unit has a component in a direction perpendicular to the optical axis.

10. An image capturing apparatus comprising:
    a imaging optical system including a first lens unit having a positive refractive power, a second lens unit having a negative refractive power, the second lens unit being movable along the optical axis so as to achieve focusing, and a rear lens unit including at least one sub lens unit; and
    a solid-state image sensing element configured to receive an image formed by the imaging optical system;
    wherein the first lens unit, the second lens unit, and the rear lens unit are disposed in this order from an object side to an image side, and wherein the first lens unit includes a first lens sub-unit including a single lens having a positive refractive power, a second lens sub-unit including a diffractive optical part and having a positive refractive power, and a third lens sub-unit having a negative refractive power, the first to third lens sub-units are disposed in this order from the object side to the image side, and an air gap between the first lens sub-unit and the second lens sub-unit is the largest in the first lens unit while an air gap between the second lens sub-unit and the third lens sub-unit is the second largest in the first lens unit, and wherein the diffractive optical part is convex towards the object side and the following condition is satisfied:

$$0.05 < L1/OTL < 0.2$$

where L1 denotes a distance between the first lens sub-unit and the second lens sub-unit and OTL denotes the total optical length of the imaging optical system to the imaging plane.

11. The imaging optical system according to claim 8, wherein the rear lens unit includes:
    a first rear lens sub-unit having a positive refractive power;
    a second rear lens sub-unit having a negative refractive power; and
    a third rear lens sub-unit having a positive optical power, wherein the first to third rear lens subunits are disposed in this order from the object side to the image side.

* * * * *